United States Patent
Chen et al.

(10) Patent No.: US 11,825,300 B2
(45) Date of Patent: Nov. 21, 2023

(54) APPLICATION CONTROLLING METHOD, APPLICATION CONTROLLING APPARATUS AND STORAGE MEDIUM

(71) Applicant: BEIJING XIAOMI MOBILE SOFTWARE CO., LTD., Beijing (CN)

(72) Inventors: Weihao Chen, Beijing (CN); Mengyu Si, Beijing (CN); Xin Wang, Beijing (CN); Jiacheng Shi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 592 days.

(21) Appl. No.: 16/899,901

(22) Filed: Jun. 12, 2020

(65) Prior Publication Data

US 2021/0176630 A1 Jun. 10, 2021

(30) Foreign Application Priority Data

Dec. 6, 2019 (CN) .......................... 201911241569.6

(51) Int. Cl.
| | |
|---|---|
| G06F 21/62 | (2013.01) |
| H04W 12/02 | (2009.01) |
| H04W 12/00 | (2021.01) |
| G10L 17/00 | (2013.01) |
| G06K 9/00 | (2022.01) |
| H04W 12/30 | (2021.01) |
| G06V 40/16 | (2022.01) |

(52) U.S. Cl.
CPC ........ *H04W 12/02* (2013.01); *G06F 21/6209* (2013.01); *G06V 40/172* (2022.01); *G10L 17/00* (2013.01); *H04W 12/35* (2021.01)

(58) Field of Classification Search
CPC .... G06F 21/32; G06F 21/121; G06F 21/6209; G06F 2221/2141; G06F 2221/2147; H04W 12/35; H04W 12/02; G06V 40/172; G10L 17/00
See application file for complete search history.

(56) References Cited

U.S. PATENT DOCUMENTS

| | | | |
|---|---|---|---|
| 9,076,008 B1 * | 7/2015 | Moy .................... | G06F 21/6227 |
| 9,596,551 B2 * | 3/2017 | Pedersen ................ | H04R 25/65 |
| 9,844,700 B1 * | 12/2017 | Burleson, Jr. ......... | A63B 29/021 |
| 10,123,298 B1 * | 11/2018 | De Lorenzo .......... | G01S 5/0263 |

(Continued)

FOREIGN PATENT DOCUMENTS

| | | |
|---|---|---|
| CN | 107066274 A | 8/2017 |
| CN | 107077550 A | 8/2017 |

(Continued)

OTHER PUBLICATIONS

Extended European Search Report in Application No. 20194009.5, dated Feb. 24, 2021.

(Continued)

*Primary Examiner* — Mohammad A Siddiqi
(74) *Attorney, Agent, or Firm* — SYNCODA LLC; Feng Ma

(57) ABSTRACT

An application controlling method includes: determining a control authority of a current user of a terminal when it is determined that the current user of the terminal is changed; and locking a predetermined application in the terminal when the current user does not have control authority. As such, privacy of the authorized user can be protected.

17 Claims, 4 Drawing Sheets

(56) References Cited

U.S. PATENT DOCUMENTS

| | | | |
|---|---|---|---|
| 10,681,205 B1* | 6/2020 | Xu | G06F 21/31 |
| 2012/0136618 A1* | 5/2012 | Lahaie | G01P 15/00 |
| | | | 702/141 |
| 2013/0031585 A1* | 1/2013 | Itagaki | H04N 21/4821 |
| | | | 725/49 |
| 2014/0019253 A1* | 1/2014 | Ricasata | G06Q 30/0241 |
| | | | 705/14.66 |
| 2014/0059494 A1* | 2/2014 | Lee | G06F 3/0482 |
| | | | 715/835 |
| 2014/0244272 A1* | 8/2014 | Shao | G06F 3/01 |
| | | | 704/275 |
| 2015/0033364 A1 | 1/2015 | Wong | |
| 2015/0288688 A1* | 10/2015 | Derakhshani | H04W 12/126 |
| | | | 726/19 |
| 2015/0358333 A1* | 12/2015 | Cronin | H04L 63/0861 |
| | | | 726/7 |
| 2018/0262472 A1* | 9/2018 | Frederick | H04L 9/0819 |
| 2019/0098009 A1* | 3/2019 | Lee | H04L 9/321 |
| 2020/0045042 A1* | 2/2020 | Peng | H04L 9/0643 |
| 2020/0057862 A1* | 2/2020 | Sabarish | G06F 21/31 |
| 2020/0125720 A1* | 4/2020 | Englund | G06F 21/57 |

FOREIGN PATENT DOCUMENTS

| | | |
|---|---|---|
| EP | 3270313 A1 | 1/2018 |
| EP | 3416079 A1 | 12/2018 |

OTHER PUBLICATIONS

CN First Office Action in Application No. 201911241569.6, dated Oct. 18, 2021.

* cited by examiner

APPLICATION CONTROLLING METHOD, APPLICATION CONTROLLING APPARATUS AND STORAGE MEDIUM

CROSS-REFERENCE TO RELATED APPLICATION

This disclosure claims priority to Chinese Patent Application No. 201911241569.6 filed on Dec. 6, 2019, the disclosure of which is hereby incorporated by reference in its entirety.

BACKGROUND

With the development of electronics technologies and users' living standards, mobile terminals have become daily necessities in various places of works and lives. Meanwhile, users pay more and more attention to privacy protections

SUMMARY

The present disclosure generally relates to a technical field of mobile terminals, and more specifically to an application controlling method, an application controlling apparatus and a storage medium.

According to an aspect of embodiments of the present disclosure, there is provided an application controlling method, including: determining a control authority of a current user of a terminal when it is determined that the current user of the terminal is changed; and locking a predetermined application in the terminal when the current user does not have a control authority.

In some embodiments, the determining a control authority of a current user of a terminal includes: performing a face recognition and/or a voice recognition for the current user; determining that the current user of the terminal has the control authority when the current user passes the face recognition and/or the voice recognition; and determining that the current user of the terminal does not have control authority when the current user fails to pass the face recognition and the voice recognition.

In some embodiments, the application controlling method further includes: capturing and storing image information on the user who does not have the control authority when the predetermined application of the terminal is in a locked state and an unlocking request transmitted by the user who does not have the control authority is acquired.

In some embodiments, the determining that the current user of the terminal is changed includes: determining that the current user of the terminal is changed when an acceleration changing procedure of terminal complies with a changing procedure of increasing to a predetermined acceleration threshold from small and decreasing gradually from the predetermined acceleration threshold; and/or determining that the current user of the terminal is changed when a position changing distance of the terminal reaches a predetermined distance threshold within a designated period.

In some embodiments, the application controlling method further includes: maintaining a current setting state of a locking function for the predetermined application of the terminal when the current user has the control authority.

In some embodiments, the application controlling method further includes: terminating the face recognition and the voice recognition of the current user after a result of the face recognition and/or a result of voice recognition are acquired.

According to another aspect of embodiments of the present disclosure, there is provided an application controlling apparatus, including: a determining module for determining a control authority of a current user of a terminal when it is determined that the current user of the terminal is changed; and a locking module for locking a predetermined application in the terminal when the current user does not have the control authority.

In some embodiments, the determining module determines a control authority of a current user of a terminal by: performing a face recognition and/or a voice recognition for the current user; determining that the current user of the terminal has the control authority when the current user passes the face recognition and/or the voice recognition; and determining that the current user of the terminal does not have control authority when the current user fails to pass the face recognition and the voice recognition.

In some embodiments, the application controlling apparatus further includes: an image capturing module for capturing and storing image information on the user who does not have the control authority when the predetermined application of the terminal is in a locked state and an unlocking request transmitted by the user who does not have the control authority is acquired.

In some embodiments, the determining module determines that the current user of the terminal is changed by adopting the following ways: determining that the current user of the terminal is changed when an acceleration changing procedure of the terminal complies with a changing procedure of increasing to a predetermined acceleration threshold from small and decreasing gradually from the predetermined acceleration threshold; and/or determining that the current user of the terminal is changed when a position changing distance of the terminal reaches a predetermined distance threshold within a designated period.

In some embodiments, the application controlling apparatus further includes: a state maintaining module for maintaining a current setting state of a locking function for the predetermined application of the terminal when the current user has the control authority.

In some embodiments, the determining module is further configured to terminate the face recognition and the voice recognition of the current user after a result of the face recognition and/or a result of voice recognition are acquired.

According to yet another aspect of embodiments of the present disclosure, there is provided an application controlling apparatus, including: a processor; and a storage for storing processor executable instructions, wherein the processor is configured to any one of application controlling method described above.

According to yet another aspect of embodiments of the present disclosure, there is provided a non-transitory computer readable storage medium having instructions stored thereon, which cause, as executed by a processor, a mobile terminal to perform the any one of the methods described above.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this description, illustrate embodiments consistent with the invention and, together with the description, serve to explain the principles of the invention.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

A mobile terminal can install several applications to implement many functions, wherein some specified applications relate to the personal privacy or sensitive information of the user. When the terminal is not used by the user, the user does not desire such specified applications to be operated by other users.

Concerning a specified application related to personal privacy or sensitive information of a user, an owner of the terminal can lock the specific application of the terminal in advance. When being used, the specified application should be operated after being unlocked, whether it is for the owner of the terminal or other users, which becomes a complicated process. Further, in a case where the owner of the terminal does not previously lock the specified application in time, other users can open the specified application intentionally or accidentally, which can cause the personal privacy of the owner to be breached.

Figure 1:
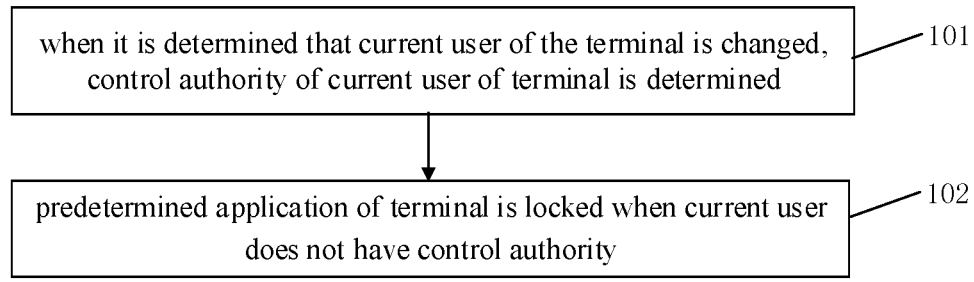
FIG. 1 is a flowchart showing an application controlling method according to some embodiments of the present disclosure.

FIG. 1 is a flowchart showing an application controlling method according to some embodiments of the present disclosure. As illustrated in FIG. 1, the application controlling method can be applied to a terminal. The terminal can be, for example, a smartphone, a tablet, a wearable device or a PC, etc. The embodiments of the present disclosure have no limitations on types of devices to which the application controlling method is applied. Referring to FIG. 1, the application controlling method includes the following steps.

In step S101, when it is determined that a current user of the terminal is changed, a control authority of the current user of the terminal is determined.

In the present disclosure, when the current user of the terminal is changed, the terminal can depart away from the owner of the terminal.

When the terminal departs away from the owner of the terminal, the current user of the terminal is not the owner of the terminal. At this time, there may be needed to limit the use authority for a part of applications in the terminal.

When it is determined that the current user of the terminal is changed, the control authority of the current user is determined to determine whether the current user is the owner of the terminal.

The owner of the terminal has the control authority for the terminal, and it is determined that the current user of the terminal does not have the control authority if the current user is not the owner of the terminal.

In step S102, a predetermined application of the terminal is locked when the current user does not have the control authority.

When the current user does not have the control authority, that is, the current user is not the owner of the terminal, the predetermined application of the terminal is locked. The predetermined application which is locked needs to be unlocked to operate at the terminal. The predetermined application in the terminal can be one or more, and can be set on the terminal by the owner of the terminal per se in advance depending on requirements.

When the current user of the terminal does not have the control authority, one or more predetermined applications in the terminal is switched to a locked state. At this time, the current user needs to unlock the predetermined application at first when opening the predetermined application. The unlocked predetermined application can be operated normally.

According to the embodiments of the present disclosure, when it is determined that the current user of the terminal is changed, the control authority of the current user of the terminal is determined, and the predetermined application in the terminal is locked if the current user does not have control authority. When the current user without the control authority tries to open the predetermined application, the predetermined application should be unlocked firstly, which can protect the privacy of the user from being revealed and ensure a usage safety of the terminal, so that experience of the user can be improved.

In some embodiments of the present disclosure, the face recognition and/or the voice recognition are performed on the current user.

The face recognition and/or the voice recognition are performed on the current user so as to determine the control authority of the current user of the terminal. One of the face recognition or the voice recognition can be performed on the current user to determine the control authority of the current user of the terminal.

The embodiments of the present disclosure have no limitation on the sequence of determining the control authority of the current user of the terminal by performing the face recognition or the voice recognition.

Like other biometrics of human's body such as fingerprints, iris, etc., the human's face is inborn, and the good characteristics of uniqueness and difficulty in copy of the face provide the necessary premise for identification. The face recognition is a biometric recognition technology for performing the identification based on the facial feature information of a person.

Voiceprint information is a type of biological information and is unique. Everyone has specific voiceprint information, and therefore different identification information of respective users can be determined through the voiceprint recognition.

The owner of the terminal can store face images in the terminal in advance. As performing the face recognition, an image including a face of the current user can be captured by a photographing device on the terminal, the captured face image of the current user is compared with the predetermined face data, and the control authority of the current user can be determined when the face image of the current user matches the predetermined face data.

Understandably, the owner of the terminal can create a user group having the control authority for the predetermined application on the terminal, and stores in advance the face images of the users in the user group. The captured face image of the current user is compared with the predetermined image data in the user group, and the control authority of the current user is determined when the face image of the current user matches the predetermined face data. It is convenient for users to open the authority of the predetermined application for relatives and friends, and no additional authentication is required when the relatives and friends use the terminal of the user, which brings convenience to the user.

Understandably, when the face recognition has been used firstly to determine whether the current operating user has the control authority and the control authority of the current operating user has been determined through the face recognition, the voice recognition would not be performed on the current user any longer. When the control authority of the current user cannot be determined through the face recognition, the voice recognition is performed on the current user. If the current user passes the voice recognition, it is determined that the current user of the terminal has the control authority.

In certain scenarios, the face recognition of the user fails due to the influence of the gesture of the current user, the posture holding the terminal, light or other factors, it is mistaken that the face image of the current user does not match the predetermined face data. In order to avoid the case where the face of the owner of the terminal fails to be recognized, the voice recognition can be performed on the current user, and it is determined that the current user of the terminal has the control authority when the voice recognition passes.

The owner of the terminal can record and store his/her voice information in the terminal in advance. By capturing a voice instruction through a voice capture device on the terminal, the captured voice instruction is compared with the voiceprint information included in the predetermined voice information, and the control authority of the current user can be determined if the voice information of the current user matches the predetermined voice information data.

Understandably, the owner of the terminal can create the user group having the control authority for the predetermined application on the terminal, and record and store in advance the voice information on the users in the user group. The voice instruction, captured by the terminal, of the current user is compared with the predetermined voice information included in the user group, and the control authority of the current user is determined when the voice information of the current user matches the predetermined voice information data.

A voice recognition module can utilize a voice assistant module configured in the terminal without increasing the additional cost.

It is determined that the current user of the terminal has the control authority when the current user passes the face recognition and/or the voice recognition.

When the control authority of the current user cannot be determined with the face recognition, the voice recognition can be performed on the current user again, and it is determined that the current user of the terminal does not have the control authority when the voice recognition still fails.

In some embodiments, the control authority of the current user of the terminal can also be determined by performing both the face recognition and the voice recognition for the current user. Both the face recognition and the voice recognition are performed on the current user simultaneously to determine the control authority of the current user of the terminal.

It is determined that the current user of the terminal does not have the control authority when the current user passes neither the face recognition nor the voice recognition.

When the current user does not have the control authority, the predetermined application of the terminal is locked. The current user has to unlock the predetermined application before using the same, and can use the predetermined application normally when the unlocking is successful.

Figure 2:
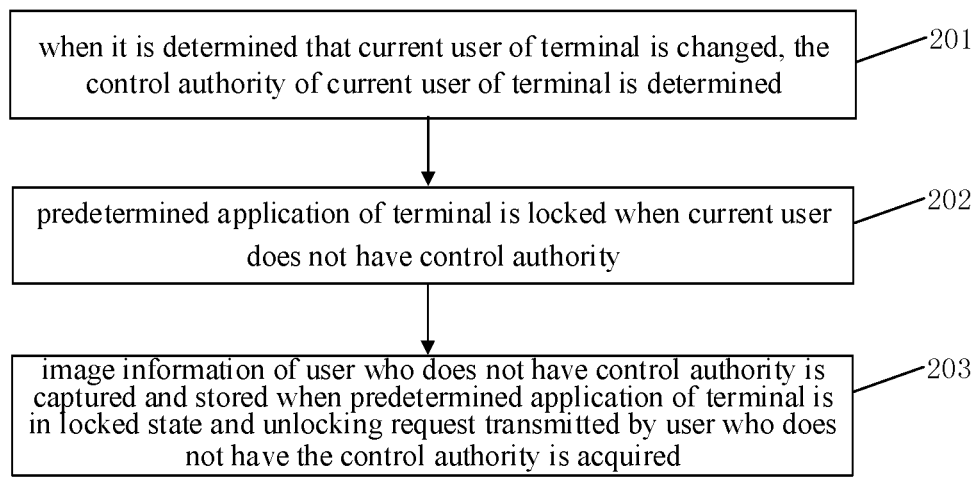
FIG. 2 is a flowchart showing an application controlling method according to some other embodiments of the present disclosure.

FIG. 2 is the flowchart showing an application controlling method, according to another exemplary embodiment of the present disclosure. As illustrated in FIG. 2, the application controlling method further includes the steps as follows.

In step S201, when it is determined that the current user of the terminal is changed, the control authority of the current user of the terminal is determined.

In step S202, the predetermined application of the terminal is locked when the current user does not have the control authority.

In step S203, the image information on the user who does not have the control authority is captured and stored when the predetermined application of the terminal is in the locked state and the unlocking request transmitted by the user who does not have the control authority is acquired.

When the current user passes neither the face recognition nor the voice recognition, it is determined that the current user of the terminal does not have the control authority. At this time, the current user is not the owner of the terminal and does not have an authority to open and operate the predetermined application.

For example, in a case where the terminal is lost or stolen, the current user attempts to unlock the predetermined application maliciously, and a photographing module in the terminal can capture the image information on the current user, and take a picture of the face image of the current user and the like. Also, the captured images without the control authority are stored in a corresponding position in the terminal, so that the owner of the terminal knows a usage situation of the terminal to be handled in time to avoid privacy leakage.

In some embodiments, it is determined that the current user of the terminal is changed when an acceleration changing procedure of the terminal complies with a changing procedure of increasing from small to a predetermined acceleration threshold and decreasing gradually from the predetermined acceleration threshold.

It is determined that the current user of the terminal is changed when a position changing distance of the terminal reaches a predetermined distance threshold within a designated period.

It is determined, according to movement state information of the terminal, that the current user of the terminal is changed. When it is determined that a transfer between users occurs at the terminal, an identity of the current user is judged to perform a locking control on the predetermined application of the terminal.

The changing of the current user of the terminal can occur after the terminal is transferred between the users, and during the transferring of the terminal, the acceleration changing procedure of terminal can comply with the changing procedure of increasing from 0 to the acceleration threshold and decreasing gradually from the acceleration threshold to 0. The acceleration threshold can be determined based on experiments and set in advance.

The terminal is provided with sensors, such as a gyro, a gravity sensor, etc., and a coprocessor, the gyro records vibration and movement situations of the terminal, the gravity sensor measures an acceleration due to the gravity, and the coprocessor judges and processes data recorded by the gyro and the gravity sensor to acquire movement data of the terminal.

The terminal can be further provided with a resident process to acquire the movement data of the terminal, including the acceleration data of movement of the terminal.

A movement changing model can be established for acceleration values of the terminal, and a threshold of a slope changing on an acceleration curve of the terminal movement is acquired through the movement changing model. When the slop changing on the acceleration curve reaches a predetermined threshold, it is judged that the terminal is transferred, that is, the current user changes, to determine that the control authority of the current user is judged.

It can also be determined that the current user of the terminal is changed when the position changing distance of the terminal reaches the predetermined distance threshold within the designated period. Furthermore, it can be determined that the current user of the terminal is changed according to the acceleration state information of the terminal together with the position changing information of the terminal.

Understandably, the current user of the terminal is changed, namely the terminal is transferred between the different users, the position changing distance of the terminal reaches the predetermined distance threshold within the designated period, for example, a very short period, and at this time, the position changing distance of the terminal when the position of the terminal changes is different from a position changing distance when the user changes holding of the terminal by himself/herself, in the designated period.

It is determined that the current user of the terminal is changed according to location technology of the terminal, such as a Global Position System (GPS) location, a Wi-Fi location and the like, based on the position changing of the terminal within a predetermined period, for example, a very short period, in connection with a time at which the position changing occurs, and then the control authority of the current user of the terminal is judged. Thus, the judgment for the change of the current user of the terminal is more accurate.

Figure 3:
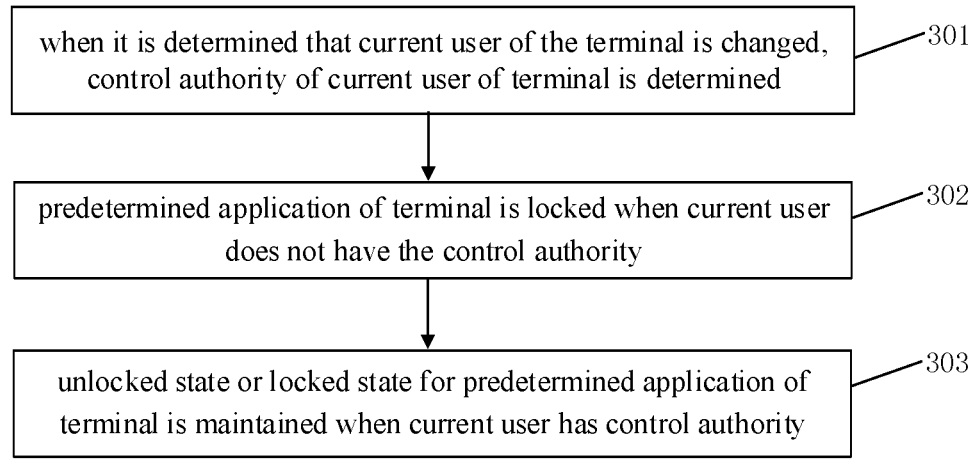
FIG. 3 is a flowchart showing an application controlling method according to yet some other embodiments of the present disclosure.

FIG. 3 is the flowchart showing an application controlling method, according to yet another exemplary embodiment of the present disclosure. As illustrated in FIG. 3, the application controlling method further includes the steps as follows.

In step S301, when it is determined that the current user of the terminal is changed, the control authority of the current user of the terminal is determined.

In step S302, the predetermined application of the terminal is locked when the current user does not have the control authority.

In step S303, an unlocked state or a locked state for the predetermined application of the terminal is maintained when the current user has the control authority.

When it is determined that the current user of the terminal is changed, it can be that the position of the owner of the terminal is changed or the owner of the terminal is moving or traveling, etc., and the current user is not changed at this time. When the current user has the control authority, the unlocked state or the locked state for the predetermined application of the terminal is maintained automatically. For the owner or authorized user of the terminal, the operations for opening the predetermined application are unchanged, which would not affect the normal use of the owner of the terminal and improve the experience of the user.

Figure 4:
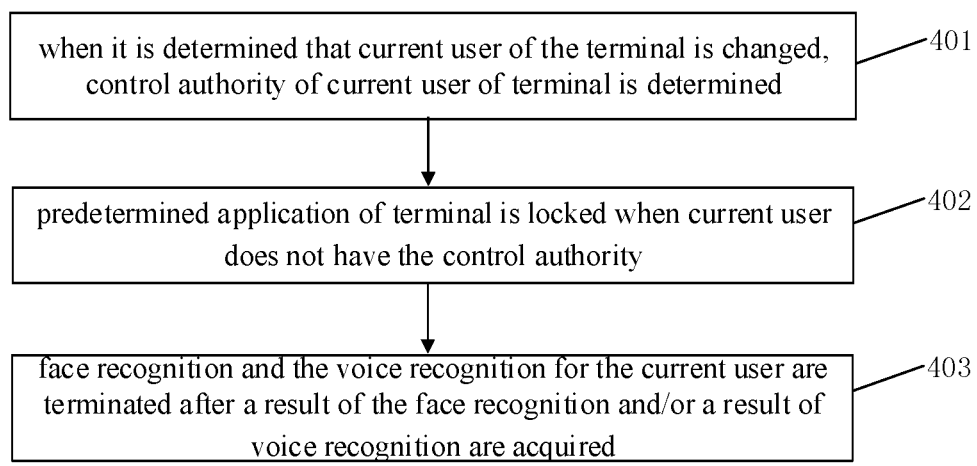
FIG. 4 is a flowchart showing an application controlling method according to some other embodiments of the present disclosure.

FIG. 4 is the flowchart showing an application controlling method, according to yet another exemplary embodiment of the present disclosure. As illustrated in FIG. 4, the application controlling method further includes the steps as follows.

In step S403, the face recognition and the voice recognition for the current user are terminated after a result of the face recognition and/or a result of voice recognition are acquired.

It is determined that the current user of the terminal has the control authority when the current user passes the face recognition or the voice recognition. It is determined that the current user of the terminal does not have the control authority when the current user passes neither the face recognition nor the voice recognition.

In order to reduce the usage power consumption of the terminal, the face recognition module and the voice recognition module enter into a sleep state in fault after the result of the face recognition and/or the result of the voice recognition are acquired. When it is determined again that the current user of the terminal is changed, the face recognition module and the voice recognition module are re-activated to judge the control authority of the current user of the terminal.

Various embodiments the present disclosure further provide an application controlling apparatus.

Figure 5:
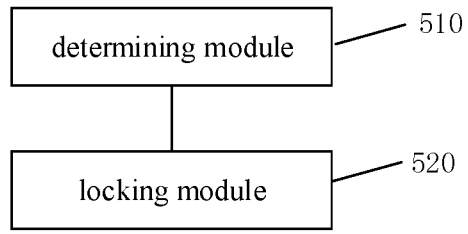
FIG. 5 is a block diagram illustrating an application controlling apparatus according to some embodiments of the present disclosure.

FIG. 5 is a block diagram illustrating an application controlling apparatus according to some embodiments of the present disclosure. As illustrated in FIG. 5, the application controlling apparatus 500 includes: a determining module 510 and a locking module 520.

The determining module 510 is configured to determine a control authority of a current user of a terminal when it is determined that the current user of the terminal is changed.

The locking module 520 is configured to lock a predetermined application in the terminal when the current user does not have control authority.

In some embodiments, the determining module 510 performs the face recognition and/or the voice recognition for the current user.

It is determined that the current user of the terminal has the control authority when the current user passes the face recognition and/or the voice recognition.

It is determined that the current user of the terminal does not have the control authority when the current user fails to pass the face recognition and the voice recognition.

Figure 6:
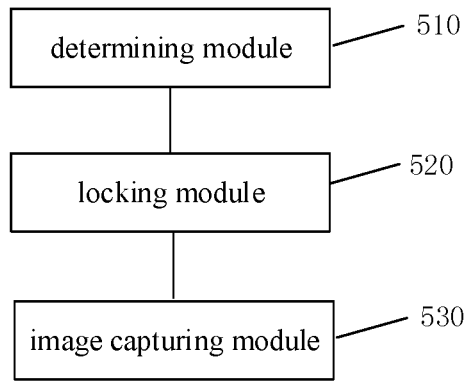
FIG. 6 is a block diagram illustrating an application controlling apparatus according to some other embodiments of the present disclosure.

FIG. 6 is a block diagram illustrating an application controlling apparatus, according to yet another exemplary embodiment of the present disclosure. As illustrated in FIG. 6, the application controlling apparatus 500 further includes an image capturing module 530.

The image capturing module 530 is configured to capture and store image information of the user who does not have the control authority when the predetermined application of the terminal is in a locked state, and an unlocking request transmitted by the user who does not have the control authority is acquired.

In some embodiments, it is determined by the determining module 510 that the current user is changed in the terminal by adopting the following ways: determining that the current user of the terminal is changed when an acceleration changing procedure of the terminal complies with a changing procedure of increasing from small to a predetermined acceleration threshold and decreasing gradually from the predetermined acceleration threshold; and/or determining that the current user of the terminal is changed when a position changing distance of the terminal reaches a predetermined distance threshold within a designated period.

Figure 7:
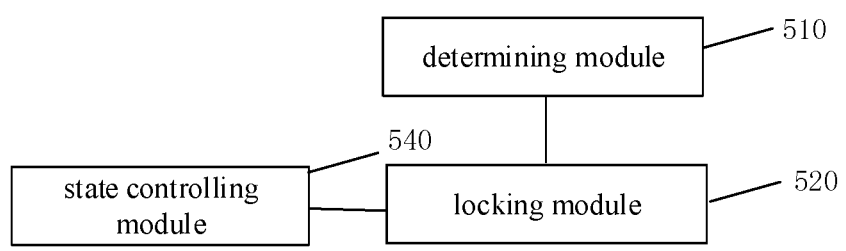
FIG. 7 is a block diagram illustrating an application controlling apparatus, according to yet some other embodiments of the present disclosure.

FIG. 7 is a block diagram illustrating an application controlling apparatus, according to yet another embodiment of the present disclosure. As illustrated in FIG. 7, the application controlling apparatus 500 further includes a state controlling module 540.

The state controlling module 540 is configured to maintain an unlocked state or locked state for the predetermined application of the terminal when the current user has the control authority.

Figure 8:
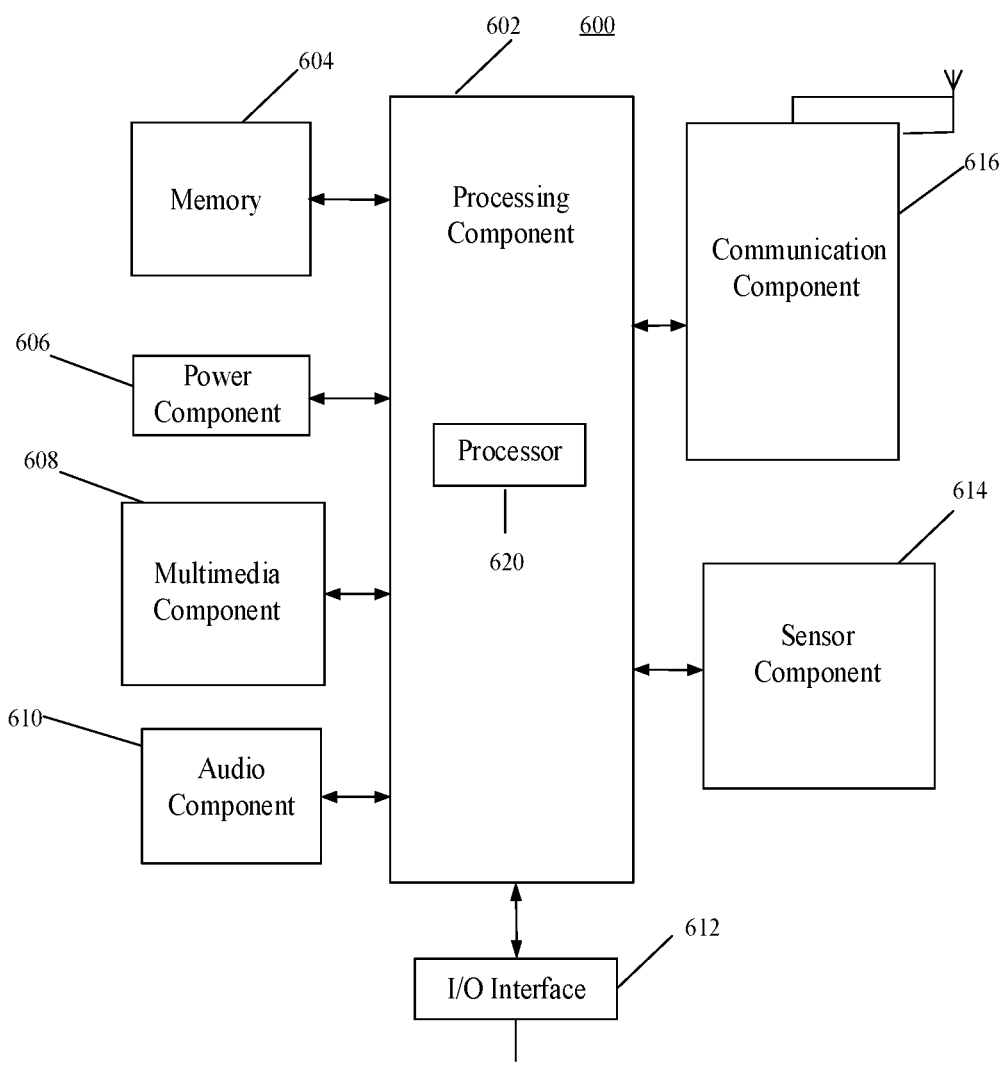
FIG. 8 is a block diagram for an application controlling apparatus according to some embodiments of the present disclosure.

In some embodiments, the determining module 510 is further configured to terminate the face recognition and the voice recognition for the current user after a result of the face recognition and/or a result of voice recognition are acquired FIG. 8 is a block diagram for the application controlling device 600 according to some embodiments. For example, the device 600 can be a mobile phone, a computer, a digital broadcast terminal, a messaging device, a gaming console, a tablet, a medical device, exercise equipment, a personal digital assistant, and the like.

Referring to FIG. 8, the device 600 can include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 can include one or more processors 620 to execute instructions to perform all or part of the steps in the above described methods. Moreover, the processing component 602 can include one or more modules which facilitate the interaction between the processing component 602 and other components. For instance, the processing component 602 can include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 can include a power management system, one or more power sources, and any other components associated with the generation, management, and distribution of power in the device 600.

The multimedia component 608 includes a screen providing an output interface between the device 600 and the user. In some embodiments, the screen can include a liquid crystal display (LCD) and a touch panel (TP). In some embodiments, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 808 includes a front camera and/or a rear camera. The front camera and the rear camera can receive an external multimedia datum while the device 600 is in an operation mode, such as a photographing mode or a video mode. Each of the front camera and the rear camera can be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal can be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons can include, but are not limited to, a home button, a volume button, a starting button, and a locking button.

The sensor component 614 includes one or more sensors to provide status assessments of various aspects of the device 600. For instance, the sensor component 614 can detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 can include a proximity sensor configured to detect the presence of nearby objects without any physical contact. The sensor component 614 can also include a light sensor, such as a CMOS or CCD image sensor, for use in imaging applications. In some embodiments, the sensor component 614 can also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as Wi-Fi, 2G, 3G, 4G, 5G or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 600 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the device 600, for performing the above-described methods. For example, the non-transitory computer-readable storage medium can be a ROM, a RAM, a CD-ROM, a magnetic tape, a floppy disc, an optical data storage device, and the like.

A non-transitory computer readable storage medium having instructions stored thereon, which cause, as executed by the processor of the mobile terminal, the mobile terminal to perform the any one of the application controlling methods described above.

The technical solutions provided according to the embodiments of the present disclosure can include the following beneficial effects: when it is determined that the current user of the terminal is changed, the control authority of the current user of the terminal is determined, and the predetermined application in the terminal is locked when the current user does not have control authority. And when the current user without the control authority tries to open the predetermined application, the predetermined application needs to be unlocked firstly, which can protect the privacy of the user from being revealed and ensure a usage safety of the terminal, so that experience of the user can be improved.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An application controlling method, applied to a terminal, comprising:
    determining a control authority of a current user of the terminal upon it is determined by measuring an acceleration due to gravity that the current user of the terminal is changed; and
    locking a predetermined application in the terminal when the current user does not have control authority,
    wherein the current user of the terminal is determined to be changed based on operations comprising:
    determining that the current user of the terminal is changed when an acceleration changing procedure of the terminal complies with a changing procedure of increasing to a predetermined acceleration threshold from small and decreasing gradually from the predetermined acceleration threshold; and
    determining that the current user of the terminal is changed when a position changing distance of the terminal reaches a predetermined distance threshold within a designated period.

2. The application controlling method of claim 1, wherein the determining the control authority of the current user of the terminal comprises:
    performing a face recognition and/or a voice recognition for the current user;
    determining that the current user of the terminal has the control authority when the current user passes the face recognition and/or the voice recognition; and
    determining that the current user of the terminal has no control authority when the current user fails to pass the face recognition and the voice recognition.

3. The application controlling method of claim 2, further comprising:
    terminating the face recognition and the voice recognition for the current user after a result of the face recognition and/or a result of voice recognition are acquired.

4. The application controlling method of claim 1, further comprising:
    capturing and storing image information on the user who does not have the control authority when the predetermined application of the terminal is in a locked state and an unlocking request transmitted by the user who does not have the control authority is acquired.

5. The application controlling method of claim 1, further comprising:
    maintaining a current setting state of a locking function for the predetermined application of the terminal when the current user has the control authority.

6. A mobile terminal implementing the method of claim 1, comprising:
    a camera configured to capture an image of the current user;
    a microphone configured to capture a voice of the current user;
    a sensor configured to measure an acceleration of the mobile terminal;
    wherein the mobile terminal is configured to:
    determine whether the current user is changed based on the measured acceleration;
    determine whether the current user has the control authority based on at least one of the captured image and the captured voice.

7. The mobile terminal of claim 6, wherein the mobile terminal is further configured to:
    maintain the unlocked state or the locked state for the predetermined application of the terminal is upon it is determined that the current user has the control authority, thereby protecting privacy of the authorized user;
    automatically lock the predetermined application of the terminal upon it is determined that the current user does not have the control authority, and store or send the captured image or voice to the authorized user.

8. An application controlling apparatus, comprising:
    memory storing processor-executable instructions; and
    a processor configured to:
    determine a control authority of a current user of a terminal when it is determined by measuring an acceleration due to gravity that the current user of the terminal is changed; and
    lock a predetermined application in the terminal when the current user does not have control authority, wherein the processor is further configured to determine that the current user of the terminal is changed by adopting:
- determining that the current user of the terminal is changed when an acceleration changing procedure of the terminal complies with a changing procedure of increasing to a predetermined acceleration threshold from small and decreasing gradually from the predetermined acceleration threshold; and
- determining that the current user of the terminal is changed when a position changing distance of the terminal reaches a predetermined distance threshold within a designated period.

9. The application controlling apparatus of claim 8, wherein the processor is configured to determine the control authority of the current user of the terminal by at least one of:
- performing a face recognition and/or a voice recognition for the current user;
- determining that the current user of the terminal has the control authority when the current user passes the face recognition and/or the voice recognition; and
- determining that the current user of the terminal does not have control authority when the current user fails to pass the face recognition and the voice recognition.

10. The application controlling apparatus of claim 9, wherein the processor is further configured to
- terminate the face recognition and the voice recognition for the current user after a result of the face recognition and/or a result of voice recognition are acquired.

11. The application controlling apparatus of claim 8, wherein the processor is further configured to:
- to capture and store image information on the user who does not have the control authority when the predetermined application of the terminal is in a locked state and an unlocking request transmitted by the user who does not have the control authority is acquired.

12. The application controlling apparatus of claim 8, wherein processor is further configured to:
- maintain a current setting state of a locking function for the predetermined application of the terminal when the current user has the control authority.

13. A non-transitory computer-readable storage medium having instructions stored thereon, which cause, as executed by a processor of a mobile terminal, the mobile terminal to perform:
- determining a control authority of a current user of the terminal upon it is determined by measuring an acceleration due to gravity that the current user of the terminal is changed; and
- locking a predetermined application in the terminal when the current user does not have control authority,
wherein the current user of the terminal is determined to be changed based on operations comprising:
- determining that the current user of the terminal is changed when an acceleration changing procedure of the terminal complies with a changing procedure of increasing to a predetermined acceleration threshold from small and decreasing gradually from the predetermined acceleration threshold; and
- determining that the current user of the terminal is changed when a position changing distance of the terminal reaches a predetermined distance threshold within a designated period.

14. The storage medium of claim 13, wherein the determining the control authority of the current user of the terminal comprises:
- performing a face recognition and/or a voice recognition for the current user;
- determining that the current user of the terminal has the control authority when the current user passes the face recognition and/or the voice recognition; and
- determining that the current user of the terminal has no control authority when the current user fails to pass the face recognition and the voice recognition.

15. The storage medium of claim 14, wherein the processor is further configured to perform:
- terminating the face recognition and the voice recognition for the current user after a result of the face recognition and/or a result of voice recognition are acquired.

16. The storage medium of claim 13, wherein the processor is further configured to perform:
- capturing and storing image information on the user who does not have the control authority when the predetermined application of the terminal is in a locked state and an unlocking request transmitted by the user who does not have the control authority is acquired.

17. The storage medium of claim 13, wherein the processor is further configured to perform:
- maintaining a current setting state of a locking function for the predetermined application of the terminal when the current user has the control authority.

* * * * *